(12) United States Patent
Izuma

(10) Patent No.: US 10,086,791 B2
(45) Date of Patent: Oct. 2, 2018

(54) GAS GENERATOR

(71) Applicant: Daicel Corporation, Osaka-shi, Osaka (JP)

(72) Inventor: Toshihiro Izuma, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 48 days.

(21) Appl. No.: 15/505,528

(22) PCT Filed: Aug. 4, 2015

(86) PCT No.: PCT/JP2015/072020
§ 371 (c)(1),
(2) Date: Feb. 21, 2017

(87) PCT Pub. No.: WO2016/042931
PCT Pub. Date: Mar. 24, 2016

(65) Prior Publication Data
US 2018/0215341 A1    Aug. 2, 2018

(30) Foreign Application Priority Data

Sep. 16, 2014    (JP) .................. 2014-187201

(51) Int. Cl.
*B60R 21/26*    (2011.01)
*B60R 21/264*    (2006.01)

(52) U.S. Cl.
CPC .............. *B60R 21/2644* (2013.01); *B60R 2021/26029* (2013.01); *B60R 2021/2648* (2013.01)

(58) Field of Classification Search
CPC .............. B60R 21/2644; B60R 21/264; B60R 2021/2648; B60R 2021/2633; B60R 2021/26029

(Continued)

(56) References Cited

U.S. PATENT DOCUMENTS 6,032,979 A    3/2000 Mossi et al.
6,139,055 A    10/2000 Dahl et al.
(Continued)

FOREIGN PATENT DOCUMENTS

JP    2010-228488 A    10/2010

*Primary Examiner* — Michael D David
(74) *Attorney, Agent, or Firm* — Birch, Stewart, Kolasch & Birch, LLP

(57) ABSTRACT

The present invention provides a gas generator including a metallic first collar of a first igniter of an ignition device chamber, which has a first columnar main body portion, a first plate portion extending in a radial direction of a housing from part of a circumferential surface thereof, and a first wall surface formed by extending part of the first plate portion in an axial direction of the housing, a metallic second collar of a second ignition device of a second combustion chamber, which has a second columnar main body portion, a second plate portion extending in the radial direction from part of a circumferential surface thereof and a second wall surface formed by extending part of the second plate portion in the axial direction of the housing, a bottom side of the first columnar main body portion portion of the first collar being fitted in a first hole to fix a first igniter of the ignition device chamber, the first hole being one of two holes formed in the bottom plate of the housing separately from each other in the radial direction, a bottom side of the second columnar main body portion portion of the second collar being fitted in a second hole to fix a second igniter of the second combustion chamber, the second hole being the other one of the two holes formed in the bottom plate separately from each other in the radial direction, further, the first wall surface of the first collar and the second wall surface of the second collar being arranged to face each other in the radial direction, when a pressure inside the housing rises at a time of actuation, the first wall surface and the second wall surface being in contact with each other in a state of being pushed radially inward against each other.

7 Claims, 5 Drawing Sheets

(58) Field of Classification Search
USPC ......... 280/741, 736, 742; 102/200, 531, 530
See application file for complete search history.

(56) References Cited

U.S. PATENT DOCUMENTS

| | | | | |
|---|---|---|---|---|
| 6,364,354 | B1* | 4/2002 | Nakashima | ........ B01D 46/2411 |
| | | | | 280/736 |
| 6,460,883 | B1* | 10/2002 | Nakashima | ............ B01D 46/24 |
| | | | | 280/736 |
| 6,474,684 | B1* | 11/2002 | Ludwig | ............... B60R 21/2644 |
| | | | | 280/736 |
| 6,491,321 | B1* | 12/2002 | Nakashima | ............ B01D 46/24 |
| | | | | 102/530 |
| 6,547,275 | B2* | 4/2003 | Nakashima | ............ B01D 46/24 |
| | | | | 280/736 |
| 7,150,227 | B2* | 12/2006 | Matsuda | ............. B60R 21/2644 |
| | | | | 102/202 |
| 7,467,588 | B2* | 12/2008 | Matsuda | ............. B60R 21/2644 |
| | | | | 102/530 |
| 7,578,522 | B2* | 8/2009 | Hanano | ............... B60R 21/2644 |
| | | | | 102/531 |
| 8,011,303 | B2* | 9/2011 | Nakayasu | ........... B60R 21/2644 |
| | | | | 102/530 |
| 8,382,155 | B2* | 2/2013 | Nakayasu | ........... B60R 21/2644 |
| | | | | 102/530 |
| 8,585,085 | B2* | 11/2013 | Kobayashi | .......... B60R 21/2644 |
| | | | | 102/530 |
| 8,714,091 | B2* | 5/2014 | Kobayashi | .......... B60R 21/2644 |
| | | | | 102/530 |
| 9,731,679 | B2* | 8/2017 | Okuyama | ............. B60R 21/264 |
| 9,944,249 | B2* | 4/2018 | Okuyama | ............. B60R 21/264 |
| 2010/0242779 | A1 | 9/2010 | Katsuda et al. | |
| 2017/0166160 | A1* | 6/2017 | Izuma | .................. B60R 21/264 |

\* cited by examiner

[Fig. 1]
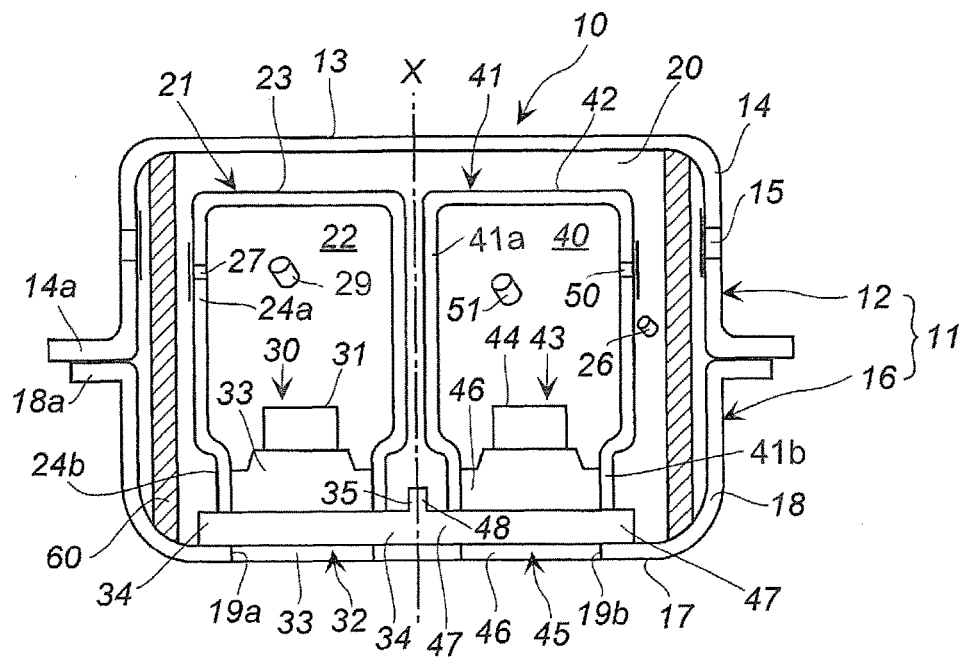
[Fig. 2]
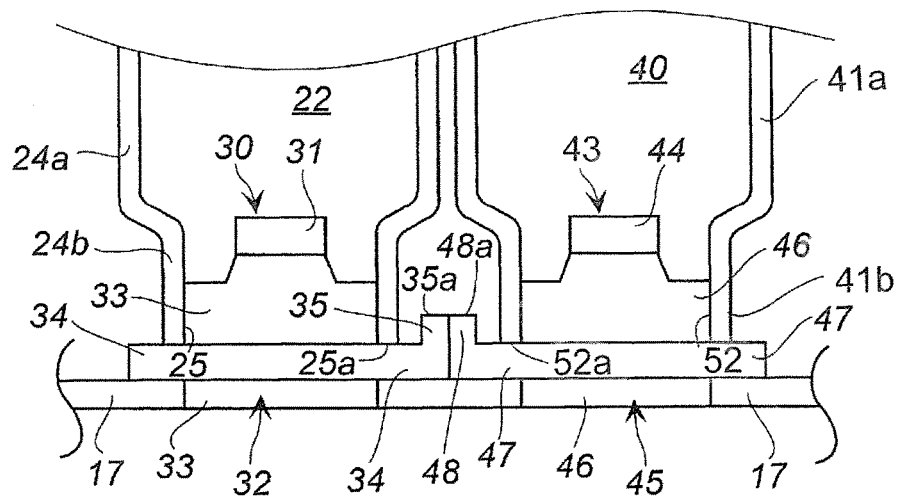

[Fig. 3]
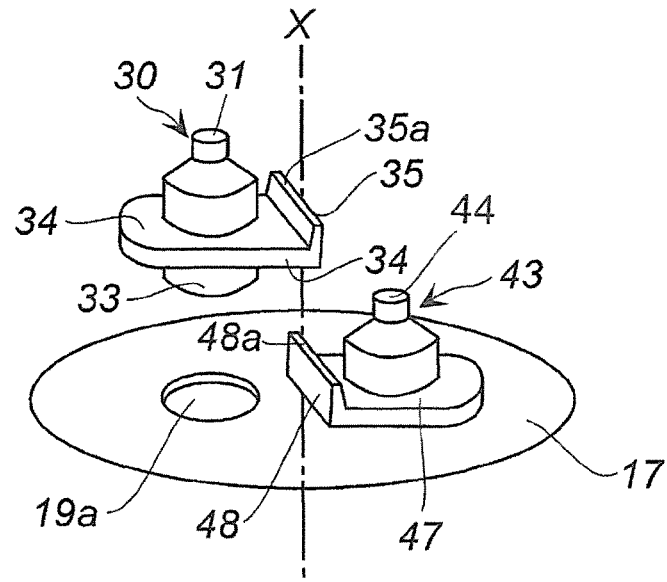
[Fig. 4]
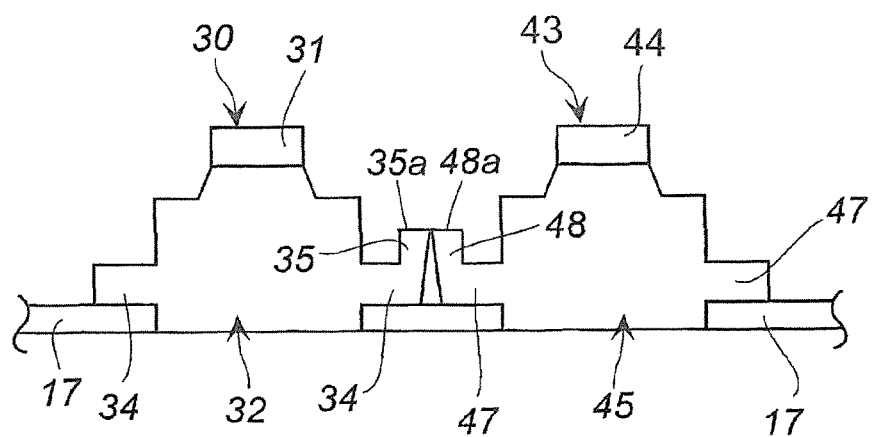

[Fig.5]
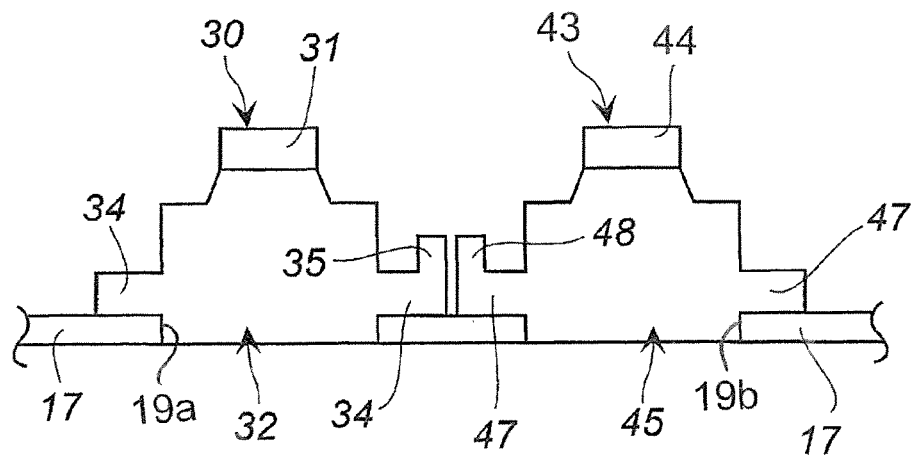
[Fig.6]
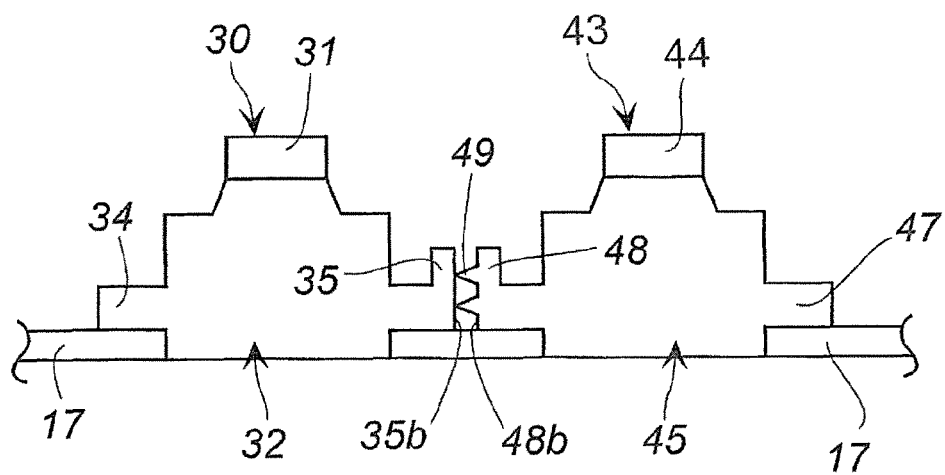

[Fig. 7]
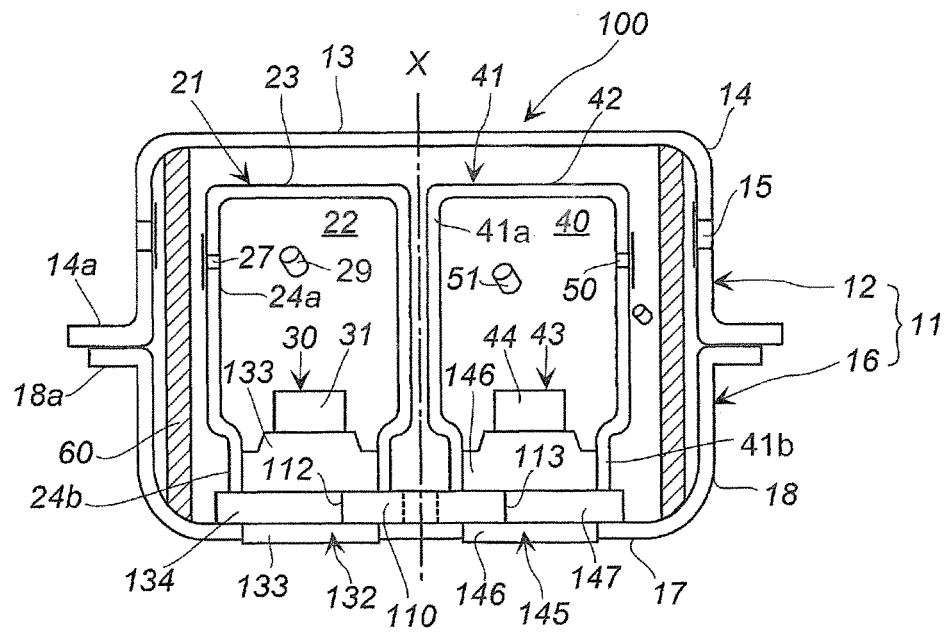
[Fig. 8]
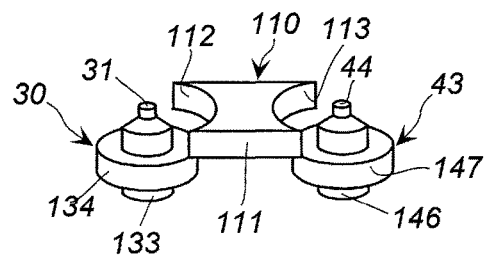

[Fig. 9]
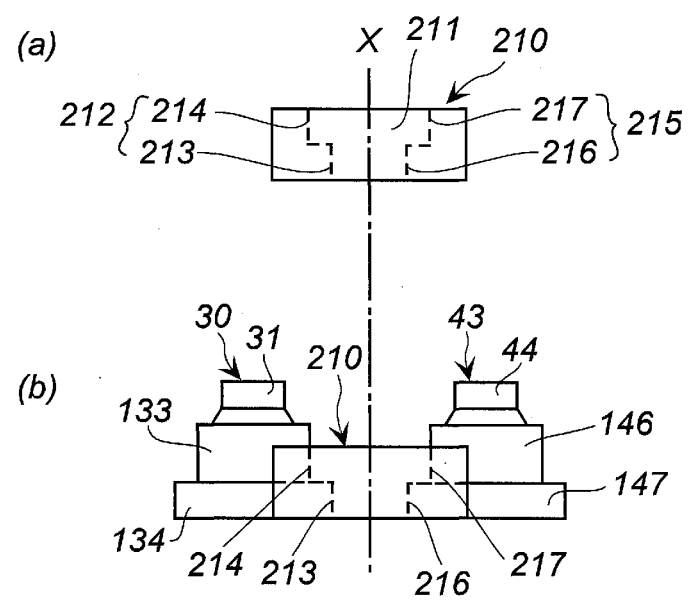

GAS GENERATOR

TECHNICAL FIELD

The present invention relates to a gas generator used for an airbag apparatus to be installed on a vehicle.

DESCRIPTION OF THE RELATED ART

In FIG. 1 of U.S. Pat. No. 6,032,979, a gas generator using two igniters 62 and 90 in a housing 12 is disclosed.

In this gas generator, an adapter (holder) 64 of the igniter device 62 and an adapter (holder) 92 of the igniter device 90 are fitted in two mounting holes 26 and 30 formed in a base portion 14.

As depicted in FIG. 1, the adapter 64 and the adapter 92 each has a columnar portion and an annular protruding portion which protrudes in the radial direction, parts of the columnar portions are individually fitted in the two mounting openings 26 and 30, and the annular protruding portions are abutted against the inner surface of the base portion 14.

The annular protruding portions of the adapter 64 and the adapter 92 face each other via a gap so as not to come into contact with each other even at the time of actuation.

An igniter cup 56 is fitted in the adapter 64, an interior 74 thereof is filled with an igniter material 60, and a first chamber (a first combustion chamber) 34 is defined outside thereof.

A cup 84 is fitted in the adapter 92, and an interior 102 thereof is filled with a gas generant material 86.

SUMMARY OF THE INVENTION

Invention 1 of the present invention provides a gas generator including a housing which has a top plate, a circumferential wall and a bottom plate, a first combustion chamber, an ignition device chamber and a second combustion chamber which are formed separately from each other inside a housing, the first combustion chamber being a space excluding the ignition device chamber and the second combustion chamber inside the housing and having a first gas generating agent accommodated therein, the first gas generating agent being ignited and burnt by a combustion product generated by combustion of an ignition agent in the ignition device chamber, the ignition device chamber having an ignition device chamber cup forming the ignition device chamber and a first ignition device including a first igniter, the first igniter including a first igniter main body portion and a first collar which is made of a metal and circumferentially encloses the first igniter main body portion, the first collar including a first columnar main body portion, a first plate portion, which extends in a radial direction of the housing from part of a circumferential surface of the first columnar main body portion, and a first wall surface which is formed by extending part of the first plate portion in an axial direction of the housing, an opening of the ignition device chamber cup being fitted to the first columnar main body portion of the first collar of a first igniter, the second combustion chamber having a second ignition device including a second igniter, and a second gas generating agent which are accommodated inside a second combustion chamber cup, the second igniter including a second igniter main body portion and a second collar which is made of a metal and circumferentially encloses the second igniter main body portion, the second collar including a second columnar main body portion, a second plate portion, which extends in the radial direction from part of a circumferential surface of the second columnar main body portion, and a second wall surface which is formed by extending part of the second plate portion in the axial direction of the housing, an opening of the second combustion chamber cup being fitted to the second columnar main body portion of the second collar of the second igniter, in the first igniter and the second igniter, a bottom side of the first columnar main body portion of the first collar being fitted in a first hole to fix the first igniter, the first hole being one of two holes formed in the bottom plate of the housing separately from each other in the radial direction of the housing, a bottom side of the second columnar main body portion of the second collar being fitted in a second hole to fix the second igniter, the second hole being the other one of the two holes formed in the bottom plate of the housing separately from each other in the radial direction of the housing, the first wall surface of the first collar and the second wall surface of the second collar being arranged to face each other in a radial direction, when a pressure inside the housing rises at a time of actuation, the first wall surface of the first igniter and the second wall surface of the second igniter being in contact with each other in a state of being pushed radially inward against each other.

Invention 2 of the present invention provides a gas generator including a housing which has a top plate, a circumferential wall and a bottom plate, a first combustion chamber, an ignition device chamber, and a second combustion chamber which are formed separately from each other inside a housing, the first combustion chamber being a space excluding the ignition device chamber and the second combustion chamber inside the housing and having a first gas generating agent accommodated therein, the first gas generating agent being ignited and burnt by a combustion product generated by combustion of an ignition agent in the ignition device chamber, the ignition device chamber having an ignition device chamber cup forming the ignition device chamber and a first ignition device including a first igniter, the first igniter including a first igniter main body portion and a first collar which is made of a metal and circumferentially encloses the first igniter main body portion, the first collar including a first columnar main body portion and a first plate portion, which extends in a radial direction of the housing from part of a circumferential surface of the first columnar main body portion, an opening of the ignition device chamber cup being fitted to the first columnar main body portion of the first collar of a first igniter, the second combustion chamber having a second ignition device including a second igniter, and a second gas generating agent which are accommodated inside a second combustion chamber cup, the second igniter including a second igniter main body portion and a second collar which is made of a metal and circumferentially encloses the second igniter main body portion, the second collar including a second columnar main body portion and a second plate portion, which extends in the radial direction from part of a circumferential surface of the second columnar main body portion, an opening of the second combustion chamber cup being fitted to the second columnar main body portion of the second collar of the second igniter, in the first igniter and the second igniter, a bottom side of the the first columnar main body portion of the first collar being fitted in a first hole to fix the first igniter, the first hole being one of two holes formed in the bottom plate of the housing separately from each other in the radial direction of the housing, a bottom side of the second columnar main body portion of the second collar being fitted in a second hole to fix the second igniter, the second hole being the other one of the two holes formed in the bottom plate of the housing separately from each other in the radial direction of the housing, the first collar and the second collar being arranged to face each other in a radial direction of the housing via a spacer facing each of the collars, when a pressure inside the housing rises at a time of actuation, the first collar and the second collar being pushed radially inward against each other through the spacer.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows an axial sectional view of the gas generator which is an embodiment of the present invention;

FIG. 2 shows a partial enlarged view of the gas generator depicted in FIG. 1;

FIG. 3 shows an explanatory drawing illustrating a method for attaching two igniters;

FIG. 4 shows an axial sectional view illustrating the attachment of two igniters in another embodiment;

FIG. 5 shows an axial sectional view illustrating the attachment of two igniters in yet another embodiment;

FIG. 6 shows an axial sectional view illustrating the attachment of two igniters in yet another embodiment;

FIG. 7 shows an axial sectional view of the gas generator which is an embodiment other than that illustrated by FIG. 1;

FIG. 8 shows an explanatory drawing illustrating the attachment method of two igniters in which a spacer is used; and FIG. 9 shows, in (a), a front view of a spacer of another embodiment and, in (b), an axial sectional view illustrating the attachment of two igniters in another embodiment.

DETAILED DESCRIPTION OF INVENTION

In the gas generator depicted in FIG. 1 of U.S. Pat. No. 6,032,979, when a pressure is generated at the time of actuation, the central portions of the housing 12 (the top plate 20 and the base portion 14) are deformed to protrude most outward.

When deformed in this way, the igniter cup 56 and the cup 84 come closer and into contact with each other. As a result, the igniter cup 56 and the cup 84 can detach from their respective adapters 64 and 92.

If the igniter cup 56 and the cup 84 are detached at the time of actuation, it can be assumed that the opening area becomes larger than the designed area, normal combustion in the igniter cup 56 and the cup 84 is impeded, and stable output performance is difficult to obtain.

The present invention provides a gas generator which demonstrates a designed stable output performance by suppressing the deformation of the housing due to the pressure at the time of actuation and preventing contact between the cup members accommodated in the housing.

The first collar of the first igniter includes a first columnar main body portion, a first plate portion, which extends in the radial direction of the housing from part of the circumferential surface of the first columnar main body portion, and a first wall surface which is formed by extending part of the first plate portion in the axial direction of the housing.

The first plate portion can be an annular plate portion (a first annular plate portion) which extends in the radial direction of the housing from the entire circumferential surface of the first columnar main body portion.

The first columnar main body portion includes an upper main body portion above the first plate portion (on the side of the top plate) and a lower main body portion below the first plate portion (a portion fitted in the first hole).

A combination of the first columnar main body portion and the first plate portion in the first collar is the same as the adapter 64 depicted in FIG. 1 of U.S. Pat. No. 6,032,979, but the first collar has the first wall surface which is not present in the adapter 64.

The second collar of the second igniter includes a second columnar main body portion, a second plate portion, which extends in a radial direction from part of a circumferential surface of the second columnar main body portion, and a second wall surface which is formed by extending part of the second plate portion in the axial direction of the housing.

The second plate portion can be an annular plate portion (a second annular plate portion) which extends in the radial direction of the housing from the entire circumferential surface of the second columnar main body portion.

The second columnar main body portion includes an upper main body portion above the second plate portion (on the side of the top plate) and a lower main body portion below the second plate portion (a portion fitted in the second hole).

A combination of the second columnar main body portion and the second plate portion in the second collar is the same as the adapter 92 depicted in FIG. 1 of U.S. Pat. No. 6,032,979, but the second collar has the second wall surface which is not present in the adapter 92.

The first igniter and the second igniter are arranged such that the first wall surface and the second wall surface face each other in the radial direction.

In order to demonstrate the effect of the present invention, it is preferable that the first wall surface and the second wall surface are arranged to face each other across the central portion of the bottom plate of the housing (that is, the center axis of the housing).

When the pressure inside the housing rises at the time of actuation and the bottom plate is to be deformed to protrude outward from the central portion, the first wall surface of the first igniter and the second wall surface of the second igniter come into contact with each other in a state of being pushed in the radial direction against each other. As a result, the bottom plate is less likely to be deformed.

Therefore, since the ignition device chamber cup and the second combustion chamber cup which are adjacent to each other are prevented from striking against each other, the ignition device chamber cup is prevented from detaching from the first collar, and the second combustion chamber cup is prevented from detaching from the second collar.

The first wall surface of the first collar and the second wall surface of the second collar are arranged to face each other in any of the following states (embodiments).

First Embodiment

An embodiment in which the first wall surface of the first collar and the second wall surface of the second collar are arranged to face each other in the radial direction in a state where the entire surfaces thereof are attached to each other.

Second Embodiment

An embodiment in which the first wall surface of the first collar and the second wall surface of the second collar are arranged to face each other in the radial direction in a state where parts thereof are attached to each other.

By using the first wall surface and the second wall surface each of which has a larger thickness on the side of the top plate and a smaller thickness on the side of the bottom plate, it is possible that when the corner portion of the first wall surface on the side of the top plate and the corner portion of the second wall surface on the side of the top plate abut against each other, the remaining surfaces thereof are arranged to face each other via a gap, without abutting against each other.

Further, by using the first wall surface and the second wall surface which are inclined so that the respective surfaces on the side of the top plate are close to each other, it is possible that the corner portion of the first wall surface on the side of the top plate and the corner portion of the second wall surface on the side of the top plate abut against each other, and the remaining surfaces thereof are arranged to face each other via a gap, without abutting against each other.

In addition, by using the first wall surface which has a flat surface and the second wall surface which has a plurality of independent projections, it is possible that the flat surface of the first wall surface and the apex portions of the independent projections of the second wall surface are in contact with each other. In this case, the first wall surface may have a plurality of independent projections, and the second wall surface may have a flat surface.

As a result, the contact area between the first wall surface and the second wall surface becomes small. Therefore, the first collar (the first igniter) and the second collar (the second igniter) are easily attached.

Third Embodiment

An embodiment in which the first wall surface of the first collar and the second wall surface of the second collar are arranged to face each other in the radial direction via a gap, the thickness of the first wall surface is the same as the thickness of the second wall surface, and the gap is not more than the thickness of the first wall surface and the second wall surface.

As a result, the first collar (the first igniter) and the second collar (the second igniter) are easily attached.

The first collar of the first igniter in Invention 2 does not have the first wall surface present in Invention 1, and the second collar of the second igniter does not have the second wall surface present in Invention 1. Other shape features of the collars are the same as those of the first collar and the second collar of Invention 1.

Therefore, the first collar of the first igniter is substantially of the same shape as the adapter 64 depicted in FIG. 1 of U.S. Pat. No. 6,032,979, and the second collar of the second igniter is substantially of the same shape as the adapter 92 depicted in FIG. 1 of U.S. Pat. No. 6,032,979.

In Invention 2, the same advantageous effect as in Invention 1 is obtained by using a spacer, and this invention can be also applied to improve a known gas generator such as the gas generator depicted in FIG. 1 of U.S. Pat. No. 6,032,979.

The first collar of the first igniter and the second collar of the second igniter are arranged to face each other in a radial direction of the housing, with a spacer being interposed therebetween. The spacer is in contact with the respective collars.

In order to demonstrate the effect of the present invention, it is preferable that the spacer is arranged in a region including the central portion of the housing bottom plate.

The spacer is preferably made of the same metal as the first collar and the second collar, but may be made of another metal.

The arrangement of the surface of the spacer that faces the first collar and the arrangement of the surface of the spacer that faces the second collar can be the same as any of the three embodiments of the arrangement of the first wall surface of the first collar of the first igniter and the second wall surface of the second collar of the second igniter in Invention 1.

When the pressure inside the housing rises at the time of actuation and the bottom plate is to be deformed to protrude outward from the central portion, the first collar of the first igniter and the second collar of the second igniter are pushed in the radial direction against each other through the spacer. As a result, the bottom plate is less likely to be deformed.

Therefore, since the ignition device chamber cup and the second combustion chamber cup are prevented from striking against each other, the ignition device chamber cup is prevented from detaching from the first collar, and the second combustion chamber cup is prevented from detaching from the second collar.

Any spacer can be used as long as it comes into contact with both the first collar of the first igniter and the second collar of the second igniter. For example, the following spacers can be used.

First Embodiment

A spacer that comes into contact with both the first plate portion of the first collar and the second plate portion of the second collar.

More specifically, the spacer includes a flat plate having a first recess and a second recess at both end sides, the first recess can come into contact with the first plate portion of the first igniter, and the second recess can come into contact with the second plate portion of the second igniter.

The thickness of the spacer is about the same as the thickness of the first plate portion and the second plate portion.

Second Embodiment

A spacer that comes into contact with both the first columnar main body portion (the upper main body portion)

of the first collar and the second columnar main body portion (the upper main body portion) of the second collar.

Third Embodiment

A spacer that comes into contact with the first plate portion and the first columnar main body portion (the upper main body portion) of the first collar and the second plate portion and the second columnar main body portion (the upper main body portion) of the second collar.

More specifically, the spacer includes a flat plate having a first recess and a second recess at both end sides, the first recess has a first-a recess on the side of the bottom plate and a first-b recess on the side of the top plate, each of which having a different depth in the radial direction, the second recess has a second-a recess on the side of the bottom plate and a second-b recess on the side of the top plate, each of which having a different depth in the radial direction, in the first recess, the first-a recess comes into contact with the first plate portion of the first collar of the first igniter, and the first-b recess comes into contact with the first columnar main body portion of the first collar of the first igniter, and in the second recess, the second-a recess comes into contact with the second plate portion of the second collar of the second igniter, and the second-b recess comes into contact with the second columnar main body portion of the second collar of the second igniter.

It is satisfied that the first-b recess of the spacer is in contact with part of the first columnar main body portion (the upper main body portion).

It is satisfied that the second-b recess of the spacer is in contact with part of the second columnar main body portion (the upper main body portion).

In the gas generator of the present invention, the deformation of the bottom plate portion of the housing at the time of actuation is suppressed. As a result, the ignition device chamber cup and the second combustion chamber cup which are arranged adjacent to each other in the housing are prevented from striking against each other and also prevented from detaching. Therefore, stable output performance is demonstrated.

Embodiments of the Invention (1) Gas Generator Depicted in FIG. 1

FIG. 1 is an axial sectional view of the gas generator which is an embodiment of the present invention. FIG. 2 is a partial enlarged view of the gas generator depicted in FIG. 1.

A gas generator 10 has a housing 11 constituted by a diffuser shell 12 and a closure shell 16.

The diffuser shell 12 has a top plate 13 and an upper circumferential wall 14 and also has an upper flange 14a at an opening. In the upper circumferential wall 14, a plurality of gas discharge ports 15, which are closed with a seal tape from the inside, are formed equidistantly in the circumferential direction.

The closure shell 16 has a bottom plate 17 and a lower circumferential wall 18, and also has a lower flange 18a at an opening.

A first hole 19a and a second hole 19b are formed at an interval in the bottom plate 17. The intermediate position between the first hole 19a and the second hole 19b coincides with a center axis X of the housing 11.

The diffuser shell 12 and the closure shell 16 are fixed by welding in a contact portion of the upper flange 14a and the lower flange 18a.

A cylindrical filter 60 is arranged inside the housing 11 at a distance from the upper circumferential wall 14 and the lower circumferential wall 18. A first combustion chamber 20 is formed on the inside of the cylindrical filter 60, and an ignition device chamber 22 and a second combustion chamber 40 are formed inside the first combustion chamber 20.

A first gas generating agent 26 is charged in the first combustion chamber 20.

The ignition device chamber 22 is defined by a first igniter 30 and an ignition device chamber cup 21.

The first igniter 30 includes a first igniter main body portion 31 and a first collar 32 which is formed of a metal and circumferentially encloses the first igniter main body portion 31. A resin may be interposed between the first igniter main body portion 31 and the first collar 32.

The first collar 32 has a first columnar main body portion 33, a first plate portion (a first annular plate portion) 34 extending annularly in the radial direction (the direction perpendicular to the center axis X) of the housing 11 from the circumferential surface of the first columnar main body portion 33, and a first wall surface 35 which is formed by extending part of the first plate portion (the first annular plate portion) 34 in the axis X direction.

The first plate portion (the first annular plate portion) 34 is not necessarily formed to be annular and may project only from the circumferential surface of the first columnar main body portion 33 on the side of the first wall surface 35. The reference numeral 35a denotes the distal end surface of the first wall surface 35.

In the first collar 32, the first columnar main body portion 33 on the side of the bottom surface (on the side of a bottom portion or a lower main body portion) is fitted in the first hole 19a, and the first plate portion 34 is arranged to be in contact with the bottom plate 17 and fixed thereto by welding in this state. Therefore, moisture does not penetrate into the housing 11 from the contact portion of the first collar 32 and the bottom plate 17.

The ignition device chamber cup 21 includes a bottom surface 23, a larger-diameter circumferential wall 24a, and a smaller-diameter circumferential wall 24b and has an opening 25. The ignition device chamber cup 21 is made of the same metal as the housing 11. A cup with a uniform outer diameter of the circumferential wall can be also used instead of that depicted in the drawings.

A first through hole 27, for releasing a combustion product generated by ignition and combustion of an ignition agent 29 inside the ignition device chamber 22, is formed in the larger-diameter circumferential wall 24a. The first through hole 27 is closed from the outside with a seal tape.

The opening 25 of the ignition device chamber cup 21 is fitted to the first columnar main body portion (the upper main body portion) 33 of the first collar 32, an annular surface 25a at the distal end of the opening 25 is abutted against the first plate portion 34, and thereby the ignition device chamber 22 is obtained.

The bottom surface 23 of the ignition device chamber cup 21 faces the top plate 13. The bottom surface 23 and the top plate 13 may be in contact with each other, or a gap in such a size that does not allow entry of the first gas generating agent 26 may be present therebetween.

The second combustion chamber 40 has a second ignition device including a second igniter 43, and a second gas generating agent 51 which are accommodated inside the second combustion chamber cup 41.

The second igniter 43 includes a second igniter main body portion 44 and a second collar 45 which is formed of a metal and circumferentially encloses the second igniter main body portion 44.

The second collar 45 includes a second columnar main body portion 46, a second plate portion (a second annular plate portion) 47 extending annularly in the radial direction from the circumferential surface of the second columnar main body portion 46, and a second wall surface 48 which is formed by extending part of the second plate portion (the second annular plate portion) 47 in the axis X direction.

The second plate portion (the second annular plate portion) 47 is not necessarily formed to be annular and may project only from the circumferential surface of the second columnar main body portion 46 on the side of the second wall surface 48. The reference numeral 48a denotes the distal end surface of the second wall surface 48.

In the second collar 45, the second columnar main body portion 46 on the side of the bottom surface (on the side of the bottom portion or the lower main body portion) is fitted in the second hole 19b, and the second plate portion 47 is arranged to be in contact with the bottom plate 17 and fixed thereto by welding in this state. Therefore, moisture does not penetrate into the housing 11 from the contact portion of the second collar 45 and the bottom plate 17.

The second combustion chamber cup 41 includes a bottom surface 42, a larger-diameter circumferential wall 41a, and a smaller-diameter circumferential wall 41b and has an opening 52. The second combustion chamber cup 41 is made of the same metal as the housing 11. A cup with a uniform outer diameter of the circumferential wall can be also used instead of that depicted in the drawings.

A second through hole 50, for releasing a combustion gas generated by ignition and combustion of the second gas generating agent 51 inside the second combustion chamber 40, is formed in the larger-diameter circumferential wall 41a. The second through hole 50 is closed from the outside with a seal tape.

The opening 52 of the second combustion chamber cup 41 is fitted to the second columnar main body portion (the upper main body portion) 46 of the second collar 45, an annular surface 52a at the distal end of the opening 52 is abutted against the second plate portion 47, and thereby the second combustion chamber 40 is obtained.

The bottom surface 42 of the second combustion chamber cup 41 faces the top plate 13. The bottom surface 42 and the top plate 13 may be in contact with each other, or a gap in such a size that does not allow entry of the first gas generating agent 26 may be present therebetween.

The first igniter 30 and the second igniter 43 are arranged such that the first wall surface 35 of the first collar 32 and the second wall surface 48 of the second collar 45 face each other in the radial direction. The first wall surface 35 and the second wall surface 48 have the same thickness.

In FIG. 1, the first wall surface 35 and the second wall surface 48 are in a state where the entire surfaces thereof are in contact with each other, but they may be also arranged such as depicted in FIGS. 4 to 6.

In the embodiment depicted in FIG. 4, the first wall surface 35 and the second wall surface 48 are in partial contact with each other.

The first wall surface 35 is adjusted such that the thickness of the distal end surface 35a is slightly larger than the thickness on the side of the first plate portion 34 (on the side of the bottom plate 17).

The second wall surface 48 is adjusted such that the thickness of the distal end surface 48a is slightly larger than the thickness on the side of the second plate portion 47 (on the side of the bottom plate 17).

In the first wall surface 35 and the second wall surface 48, a side (a corner portion) of the first wall surface 35 at the distal end surface 35a and a side (a corner portion) of the second wall surface 48 at the distal end surface 48a are in contact with each other, and a gap that increases in size towards the bottom plate 17 (a gap with an isosceles triangle cross section in the axis X direction) is formed between the other portions.

The first wall surface 35 and the second wall surface 48 can have a uniform thickness, and in that case, the first wall surface 35 and the second wall surface 48 can face each other in a state depicted in FIG. 4, by tilting the first wall surface 35 and the second wall surface 48 to come close to each other.

In the embodiment depicted in FIG. 5, the first wall surface 35 and the second wall surface 48 face each other, with a uniform gap being formed therebetween. This gap is less than the thickness of the first wall surface 35 and the second wall surface 48.

The gap can be adjusted by the distance between the first hole 19a and the second hole 19b.

In the embodiment depicted in FIG. 6, the first wall surface 35 and the second wall surface 48 are in partial contact with each other.

In the first wall surface 35, a first opposing surface 35b facing the second wall surface 48 is a flat surface.

In the second wall surface 48, a plurality of independent projections 49 are formed on a plane of a second opposing surface 48b which faces the first wall surface 35.

The first wall surface 35 and the second wall surface 48 are in a state in which the first opposing surface 35b and the apexes of the plurality of the independent projections 49 on the second opposing surface 48b are in contact with each other.

An attachment method used when attaching the first igniter 30 and the second igniter 43 to the housing 11 (the bottom plate 17) in the gas generator depicted in FIG. 1 will be described with reference to the embodiments illustrated by FIGS. 1 to 3.

FIG. 3 shows a state in which the second igniter 43 (the second collar 45) is initially fitted in the second hole 19b of the bottom plate 17, but the first igniter (the first collar 32) may be initially fitted in the first hole 19a of the bottom plate 17.

In the state depicted in FIG. 3, the second collar 45 is fitted such that the second wall surface 48 is on the side of the first igniter 30 (the first collar 32) fitted in the first hole 19a. Incidentally, a positioning means, for positioning the collar to be initially fitted (the second collar 45 in this case) with respect to the bottom plate 17, may be formed.

Next, the first igniter 30 (the first collar 32) is fitted in the first hole 19a. At this time, the first igniter 30 is fitted such that the first wall surface 35 of the first collar 32 and the second wall surface 48 of the second collar are in contact with or face each other.

Also in the embodiments depicted in FIGS. 4 to 6, the first igniter 30 and the second igniter 43 are attached in the same manner as in the abovementioned attachment method.

When the first igniter 30 and the second igniter 43 in the embodiment depicted in FIG. 4 are attached in the same manner depicted in FIG. 3, the first wall surface 35 is not in contact with the second wall surface 48 at the time of initiating the fitting of the first igniter 30 into the first hole 19a, but part of the first wall surface 35 and part of the second wall surface 48 are in contact with each other at the end of the fitting. Therefore, fitting workability is improved as compared to the embodiment depicted in FIG. 1.

When the first igniter 30 and the second igniter 43 in the embodiment depicted in FIG. 5 are attached in the same manner depicted in FIG. 3, the first wall surface 35 and the second wall surface 48 are not in contact with each other. Therefore, fitting workability is improved as compared to the embodiment depicted in FIG. 1.

When the first igniter 30 and the second igniter 43 in the embodiment depicted in FIG. 6 are attached in the same manner depicted in FIG. 3, a contact area of the first wall surface 35 and the second wall surface 48 is small. Therefore, fitting workability is improved as compared to the embodiment depicted in FIG. 1.

Next, the operation of the gas generator depicted in FIG. 1 will be described.

An embodiment in which the first igniter 30 and the second igniter 43 are actuated simultaneously will be described.

When the first igniter 30 is actuated, the ignition agent 29 in the ignition device chamber 22 is ignited and burnt, and a combustion product such as a flame is generated.

The combustion product is released from the first through hole 27 into the first combustion chamber 20, and the first gas generating agent 26 is ignited and burnt to generate a combustion gas.

The generated combustion gas passes through the cylindrical filter 60 and is discharged from the gas discharge ports 15.

When the second igniter 43 is actuated simultaneously with the first igniter 30, the second gas generating agent 51 in the second combustion chamber 40 is ignited and burnt to generate a combustion gas.

The combustion gas is released from the second through hole 50 into the first combustion chamber 20, passes through the cylindrical filter 60, and is discharged from the gas discharge ports 15.

When a pressure in the housing 11 rises in such an operation process, since the pressure is applied to the top plate 13 and the bottom plate 17, most deformable central portions of the respective plates are deformed so as to protrude on both sides in the axis X direction.

At this time, when a pressure in the axis X direction is applied to the central portion of the bottom plate 17, a force in the axis X direction is also applied to the first plate portion 34 of the first collar 32 and the second plate portion 47 of the second collar 45 which are fixed to the bottom plate 17.

However, since the first wall surface 35 of the first collar 32 and the second wall surface 48 of the second collar 45 face each other or are in contact with each other so as to extend in the axis X direction, forces are exerted to push the two wall surfaces against each other in the radial direction.

Since the first wall surface 35 and the second wall surface 48 are thus pushed against each other in the radial direction, the central portion of the bottom plate 17 is prevented from being deformed so as to protrude, and the ignition device chamber cup 21 and the second combustion chamber cup 41 are prevented from coming into contact with each other.

Thereby, it is possible to prevent the ignition device chamber cup 21 and the second combustion chamber cup 41 from being detached from the respective igniter collars at the time of actuation. Accordingly, stable output performance is maintained.

(2) Gas Generator Depicted in FIG. 7

The gas generator 100 depicted in FIG. 7 is the same as the gas generator 10 depicted in FIG. 1 except that a shape of the first collar of the first igniter and a shape of the second collar of the second igniter are partially different and that a spacer is used. The same parts as those in FIG. 1 are assigned with the same reference numerals.

A first collar 132 has a first columnar main body portion 133 and a first plate portion 134 extending from part of the circumferential surface of the first columnar main body portion 133 in the radial direction of the housing 11. The first plate portion 134 is annular.

In the first collar 132, the first columnar main body portion 133 on the side of the bottom surface (a lower main body portion) is fitted in the first hole 19a, and the first plate portion 134 is in contact with the bottom plate 17 and fixed thereto by welding in this state.

The second collar 145 includes a second columnar main body portion 146 and a second plate portion 147 extending from part of the circumferential surface of the second columnar main body portion 146 in the radial direction of the housing 11.

In the second collar 145, the second columnar main body portion 146 on the side of the bottom surface (a lower main body portion) is fitted in the second hole 19b, and the second plate portion 147 is in contact with the bottom plate 17 and fixed thereto by welding in this state.

A gap is formed between the first plate portion 134 of the first collar 132 and the second plate portion 147 of the second collar 145, and a spacer 110 is fitted in the gap as depicted in FIGS. 7 and 8.

The spacer 110 has a first recess 112 and a second recess 113 receding in the deformation direction at both end sides of a flat plate portion 111.

The first recess 112 has a shape that can abut against the first plate portion 134, and the second recess 113 has a shape that can abut against the second plate portion 147.

The arrangement of the first recess 112 of the spacer 110 and the first plate portion 134 can be the same as the arrangement of any one of the first wall surface 35 and the second wall surface 48 depicted in FIGS. 2 and 4 to 6.

The arrangement of the second recess 113 of the spacer 110 and the second plate portion 147 can be the same as the arrangement state of any one of the first wall surface 35 and the second wall surface 48 depicted in FIGS. 2 and 4 to 6.

In the gas generator 100, when a force is applied in the axis X direction to the top plate 13 and the bottom plate 17 of the housing 11 at the time of actuation, forces are applied to the first recess 112 and the first plate portion 134 to push against each other in the radial direction, and forces are applied to the second recess 113 and the second plate portion 147 to push against each other in the radial direction.

Since the forces that push radially against each other are thus applied, the central portion of the bottom plate 17 is prevented from being deformed to protrude, and the ignition device chamber cup 21 and the second combustion chamber cup 41 are prevented from contacting each other.

FIG. 9 shows an embodiment in which a spacer 210 of an embodiment different from that illustrated by FIGS. 7 and 8 is used.

The spacer 210 has a first recess 212 and a second recess 215 receding in the radial direction of the housing 11 at both end sides of a flat plate portion 211.

The first recess 212 has a first-a recess 213 on the side of the bottom plate 17 and a first-b recess 214 on the side of the top plate 13, each of which having a different depth in the radial direction of the housing 11.

The second recess 215 has a second-a recess 216 on the side of the bottom plate 17 and a second-b recess 217 on the side of the top plate 13, each of which having a different depth in the radial direction.

The first recess 212 has a shape such that the first-a recess 213 can abut against the first plate portion 134 of the first collar 132, and the first-b recess 214 can abut against the first columnar main body portion 133 of the first collar 132.

The second recess 215 has a shape such that the second-a recess 216 can abut against the second plate portion 147 of the second collar 145, and the second-b recess 217 can abut against the second columnar main body portion 146 of the second collar 145.

The arrangement of the first recess 212 of the spacer 210, the first plate portion 134, and the first columnar main body portion 133 can be the same as the arrangement of any one of the first wall surface 35 and the second wall surface 48 depicted in FIGS. 2 and 4 to 6.

The arrangement of the second recess 215 of the spacer 210, the second plate portion 147, and the second columnar main body portion 146 can be the same as the arrangement of any one of the first wall surface 35 and the second wall surface 48 depicted in FIGS. 2 and 4 to 6.

When a force is applied in the axis X direction to the top plate 13 and the bottom plate 17 of the housing 11 at the time of actuation of the gas generator 100, forces are applied to the first recess 212, the first plate portion 134, and the first columnar main body portion 133 to push against each other in the radial direction, and forces are applied to the second recess 215, the second plate portion 147, and the second columnar main body portion 146 to push against each other in the radial direction.

Since the forces that push radially against each other are thus applied, the central portion of the bottom plate 17 is prevented from being deformed to protrude, and the ignition device chamber cup 21 and the second combustion chamber cup 41 are prevented from contacting each other.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising
   a housing which has a top plate, a circumferential wall and a bottom plate,
   a first combustion chamber, an ignition device chamber and a second combustion chamber which are formed separately from each other inside a housing,
   the first combustion chamber being a space excluding the ignition device chamber and the second combustion chamber inside the housing and having a first gas generating agent accommodated therein, the first gas generating agent being ignited and burnt by a combustion product generated by combustion of an ignition agent in the ignition device chamber,
   the ignition device chamber having
   an ignition device chamber cup forming the ignition device chamber and a first ignition device including a first igniter,
   the first igniter including a first igniter main body portion and a first collar which is made of a metal and circumferentially encloses the first igniter main body portion,
   the first collar including a first columnar main body portion, a first plate portion, which extends in a radial direction of the housing from part of a circumferential surface of the first columnar main body portion, and a first wall surface which is formed by extending part of the first plate portion in an axial direction of the housing,
   an opening of the ignition device chamber cup being fitted to the first columnar main body portion of the first collar of the first igniter,
   the second combustion chamber having
   a second ignition device including a second igniter, and a second gas generating agent which are accommodated inside a second combustion chamber cup,
   the second igniter including a second igniter main body portion and a second collar which is made of a metal and circumferentially encloses the second igniter main body portion,
   the second collar including a second columnar main body portion, a second plate portion, which extends in a radial direction from part of a circumferential surface of the second columnar main body portion, and a second wall surface which is formed by extending part of the second plate portion in the axial direction of the housing,
   an opening of the second combustion chamber cup being fitted to the second columnar main body portion of the second collar of the second igniter,
   in the first igniter and the second igniter,
   a bottom side of the first columnar main body portion of the first collar being fitted in a first hole to fix the first igniter, the first hole being one of two holes formed in the bottom plate of the housing separately from each other in the radial direction of the housing,
   a bottom side of the second columnar main body portion of the second collar being fitted in a second hole to fix the second igniter, the second hole being the other one of the two holes formed in the bottom plate of the housing separately from each other in the radial direction of the housing,
   the first wall surface of the first collar and the second wall surface of the second collar being arranged to face each other in a radial direction,
   when a pressure inside the housing rises at a time of actuation, the first wall surface of the first igniter and the second wall surface of the second igniter being in contact with each other in a state of being pushed radially inward against each other.

2. The gas generator according to claim 1, wherein the first wall surface of the first collar and the second wall surface of the second collar are arranged to face each other in the radial direction in a state where the entire surfaces thereof are attached to each other.

3. The gas generator according to claim 1, wherein the first wall surface of the first collar and the second wall surface of the second collar are arranged to face each other in the radial direction in a state where parts thereof are attached to each other.

4. The gas generator according to claim 1, wherein the first wall surface of the first collar and the second wall surface of the second collar are arranged to face each other in the radial direction via a gap, the thickness of the first wall surface is the same as the thickness of the second wall surface, and the gap is not more than the thickness of the first wall surface and the second wall surface.

5. A gas generator comprising
   a housing which has a top plate, a circumferential wall and a bottom plate,
   a first combustion chamber, an ignition device chamber, and a second combustion chamber which are formed separately from each other inside a housing,
   the first combustion chamber being a space excluding the ignition device chamber and the second combustion chamber inside the housing and having a first gas generating agent accommodated therein, the first gas generating agent being ignited and burnt by a combustion product generated by combustion of an ignition agent in the ignition device chamber, the ignition device chamber having an ignition device chamber cup forming the ignition device chamber and a first ignition device including a first igniter, the first igniter including a first igniter main body portion and a first collar which is made of a metal and circumferentially encloses the first igniter main body portion, the first collar including a first columnar main body portion and a first plate portion, which extends in a radial direction of the housing from part of a circumferential surface of the first columnar main body portion, an opening of the ignition device chamber cup being fitted to the first columnar main body portion of the first collar of a first igniter, the second combustion chamber having a second ignition device including a second igniter, and a second gas generating agent which are accommodated inside a second combustion chamber cup, the second igniter including a second igniter main body portion and a second collar which is made of a metal and circumferentially encloses the second igniter main body portion, the second collar including a second columnar main body portion and a second plate portion, which extends in the radial direction from part of a circumferential surface of the second columnar main body portion, an opening of the second combustion chamber cup being fitted to the second columnar main body portion of the second collar of the second igniter, in the first igniter and the second igniter, a bottom side of the the first columnar main body portion of the first collar being fitted in a first hole to fix the first igniter, the first hole being one of two holes formed in the bottom plate of the housing separately from each other in the radial direction of the housing, a bottom side of the second columnar main body portion of the second collar being fitted in a second hole to fix the second igniter, the second hole being the other one of the two holes formed in the bottom plate of the housing separately from each other in the radial direction of the housing, the first collar and the second collar being arranged to face each other in a radial direction of the housing via a spacer facing each of the collars, when a pressure inside the housing rises at a time of actuation, the first collar and the second collar being pushed radially inward against each other through the spacer.

6. The gas generator according to claim 5, wherein the spacer comprises a flat plate having a first recess and a second recess at both end sides, the first recess comes into contact with the first plate portion of the first igniter, and the second recess comes into contact with the second plate portion of the second igniter.

7. The gas generator according to claim 5, wherein the spacer comprises a flat plate having a first recess and a second recess at both end sides, the first recess has a first-a recess on the side of the bottom plate and a first-b recess on the side of the top plate, each of which having a different depth in the radial direction, the second recess has a second-a recess on the side of the bottom plate and a second-b recess on the side of the top plate, each of which having a different depth in the radial direction, in the first recess, the first-a recess comes into contact with the first plate portion of the first collar of the first igniter, and the first-b recess comes into contact with the first columnar main body portion of the first collar of the first igniter, and in the second recess, the second-a recess comes into contact with the second plate portion of the second collar of the second igniter, and the second-b recess comes into contact with the second columnar main body portion of the second collar of the second igniter.

* * * * *